United States Patent [19]

Rakshys, Jr.

[11] 3,716,501

[45] Feb. 13, 1973

[54] STABLE CARBONIUM ION RESINS AND METHOD OF PREPARATION

[75] Inventor: Joseph W. Rakshys, Jr., Framingham, Mass.

[73] Assignee: The Dow Chemical Company, Midland, Mich.

[22] Filed: March 8, 1971

[21] Appl. No.: 122,239

[52] U.S. Cl. ............................260/2.1 E, 260/88.1 P
[51] Int. Cl. ...................................................C08f 19/20
[58] Field of Search ...................................260/2.1 E

[56] References Cited

OTHER PUBLICATIONS

Kim, Daehan Hwahak Hwoejee 14, 37–43 (1970)
Braun et al., Angew. Chem. 78, 905–906 (1966)
Braun et al., Makromol. Chem. 114, 51–69 (1968)

*Primary Examiner*—Melvin Goldstein
*Attorney*—Griswold & Burdick, Stephen Hoynak and Glwynn R. Baker

[57] ABSTRACT

Stable cross-linked carbonium ion resins having a plurality of triarylmethyl carbonium ion pendant groups are prepared by polymerizing a vinyl triaryl carbinol compound, alone or with a second monoolefinic monomer, and a poly-unsaturated monomer or by preparing a cross-linked polymer containing p-bromo or p-iodo styrene pendant groups, lithiating the polymer and reacting with an aromatic ketone and converting the triaryl carbinol to a carbonium ion. The cross-linked carbonium ion resins are useful as ion exchange resins for organic solvent systems.

14 Claims, No Drawings

STABLE CARBONIUM ION RESINS AND METHOD OF PREPARATION

BACKGROUND OF INVENTION

Soluble, linear, non-cross-linked polystyrene with monomethoxytrityl chloride, or trityl chloride or triphenylmethyl or phenyl-bis-[4(dimethylamino)phenyl] carbinol pendant groups on the linear aliphatic hydrocarbon backbone are known. Non-cross-linked carbonium ion polymers prepared from these carbinols are also known. A method for preparing the linear polymers is described in Angewandte Chemie 73 No. 6, 197–208, (1961), in an article entitled "Macromolecular Organic Compounds" by D. Braun. The procedure consists of treating poly-p-iodo styrene with butyl lithium to form the p-lithium polystyrene. The latter is reacted with an appropriate ketone to form the p-carbinol derivative. The reaction is carried out with the butyl lithium and poly-p-iodostyrene in solution in benzene.

The linear polymers containing the pendant triaryl carbinol groups are soluble in many organic solvents and so cannot be used for preparing salts having ion exchange properties for organic solvent systems. Further, such salts are reactive with water which converts the salts back to the carbinol, so that the salts, although they may be water insoluble, cannot function effectively as ion exchange resins in organic systems It is an object of this invention to prepare cross-linked polymers containing stable carbonium ions in the pendant groups.

It is another object of this invention to prepare the said stable carbonium ion-containing cross-linked polymers by copolymerizing a vinyl triaryl carbinol either alone or with a monoolefinic comonomer and a polyolefinic cross-linking agent.

It is yet another object of this invention to convert a cross-linked polymer having no pendant carbonium ion groups to one having said groups.

SUMMARY OF INVENTION

According to the invention cross-linked polymers having a plurality of

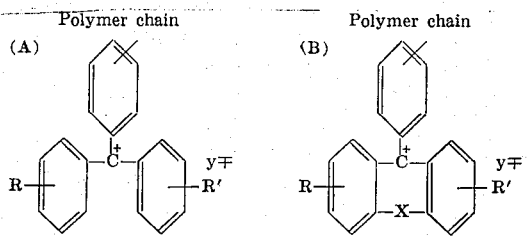

pendant groups attached to the cross-linked polymer backbone are provided. In the above formulas the triaryl carbonium portion of the molecule can be attached through ortho, meta or para positions of the phenyl group. R and/or R' represent one to four alkyl groups of one to four carbon atoms, one to four aryl groups, including phenyl, tolyl, xylyl, naphthyl, biphenylyl or halogenated derivatives thereof, halogen, OR'', SR'' NR$_2$'' where R'' is H, alkyl group of one to four carbon atoms or aryl group having from one to three rings and X is a hetero atom, including O, S, and N, and y is an anion, including BF$_4^-$, ClO$_4^-$, SbCl$_5$Z$^-$, where Z is SbCl$_6^-$, CnCl$_5^-$, AlBr$_4^-$ halogen, or OH. Polymers having pendant groups of structure A are of special interest and are preferred.

The carbonium ion-containing cross-linked polymers can be prepared by polymerizing the corresponding vinyl carbinol, either alone, or with another monoolefinically unsaturated comonomer, and a cross-linking agent, which is preferably a polyunsaturated compound including polyvinyl aromatic hydrocarbons such as divinyl benzene, vinyl isopropenyl benzene, diisopropenyl benzene, divinyl toluene, vinyl isopropenyl toluene, diisopropenyl toluene, trivinyl benzene, trivinyl cyclohexane, divinyl cyclohexane, or vinyl cyclohexene. The cross-linking agent must have at least two polymerizable olefinic linkages. The polymerization can be effected from solutions of the monomers, in aqueous emulsions or in suspension. The suspension procedure is preferred, because it results in small, hard, insoluble beads of fairly uniform size. These are easily separated from the polymerization mixture by filtration.

In an alternative procedure a cross-linked insoluble polymer containing a plurality of bromo or iodo aryl, phenyl or alkyl substituted phenyl groups, derived from bromo or iodo monovinylidene aromatic monomers which are polymerized alone or with another monoolefinic comonomer and a polyunsaturated cross-linking agent are converted to lithium-containing polymers. The latter are then reacted with aryl ketones to form the triaryl carbinols.

The cross-linked polymer containing the triaryl carbinol linkage can then be converted to a triaryl carbonium ion derivative by reaction with a Lewis or protic acid. Carbonium ion resins with non-nucleophilic anions are readily prepared. Included among the anions are BF$_4^-$, ClO$_4^-$, SbCl$_6^-$, SbCl$_5$OH$^-$, SnCl$_5^-$, and AlBr$_4^-$. This conversion of the triaryl carbinol pendant groups to carbonium ions is carried out in a solvent which swells the carbinol-containing polymer and the ionic form of the polymer. Such solvents include methylene chloride, chloroform, dichloroethane, acetonitrile, propionitrile, benzonitrile, nitromethane, nitrobenzene, and orthodichlorobenzene. With the nitrile solvents, the temperature should not be above about 100°C. because the carbonium ions may react with the nitrile group at higher temperatures.

The vinyl triaryl carbinol monomers can be prepared by reacting a vinyl haloaryl compound in which the halogen atom has an atomic number greater than 9 (e.g., chloro, bromo, or iodo) with magnesium to make the corresponding Grignard reagent and then reacting the latter in an inert solvent with a diaryl ketone. Included among the ketones which can be reacted are compounds of the formulas:

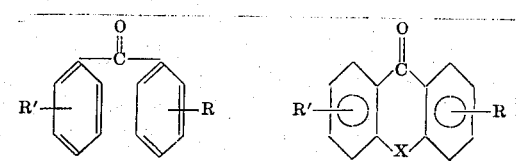

where X is as defined above and R is alkyl of one to four carbon atoms, aryl, i.e., phenyl, halosubstituted phenyl, alkyl substituted phenyl in which the alkyl group contains one to seven carbon atoms and the number of alkyl substituents ranges from one to five, naphthyl, halonaphthyl, alkyl substituted naphthyl in which the alkyl group contains one to four carbon atoms and the number of alkyl substituents ranges from one to four, OH, SH, —O-alkyl, —S-alkyl, —O-aryl, —S-aryl, N-dialkyl, or N-diaryl. The substituents can be in any position on the aryl ring.

Representative solvents in which the Grignard reagent can be made and reacted with the diaryl ketone are linear or cyclic liquid ethers, including diethyl ether, ethyl propyl ether, and tetrahydrofuran.

The vinyl triaryl carbinol can be homopolymerized or copolymerized with or without a catalyst. A free radical catalyst polymerization is preferred. Included are the well known peroxides, typical representatives of which benzoyl peroxide, lauroyl peroxide, tertbutylperbenzoate, or other free radical catalysts including azo bis-isobutyronitrile, actinic light and gamma rays. Thermally initiated polymerization can also be employed.

Comonomers which can be copolymerized include styrene, methyl styrene, vinyl toluene, vinyl xylene, isopropenyl toluene, isopropenyl xylene, ethyl styrene, and ar-ethyl isopropenyl benzene.

The proportion of cross-linking agent can range from about 0.1 to about 5 percent by weight of monomers. The amount of triaryl carbinol, or its precursor, can range from about one to about 99.9 percent by weight of the mixture. Preferably the triaryl carbinol, or its precursor, is from about 10 to 60 weight percent and a comonomer between 39.9 and 89.9 percent.

PREPARATION OF TRIARYL CARBINOL-CONTAINING POLYMERS

A Grignard reagent was prepared under $N_2$ from 0.26 g. mole Mg and 0.24 mole p-chlorostyrene in 100 ml. 3:2 mixture by volume of tetrahydrofuran and diethyl ether. To the Grignard reagent 0.2 mole of benzophenone was added. After stirring at room temperature for two hours the mixture was hydrolyzed with aqueous $NH_4Cl$ and the layers were separated. The aqueous layer was washed with diethyl ether, the organic layers were combined, dried over $Na_2SO_4$ and the solvent was removed. The residual oil was taken up in hexane and filtered after several hours to remove a small amount of homopolymeric p-vinyltriphenyl carbinol (monomer). The hexane solution was reduced in volume and chilled. The monomer homopolymerizes slowly even without a catalyst. For this reason the hexane concentrate was filtered again just before further use in preparing the following copolymer.

A cross-linked copolymer was prepared by suspension polymerization of 3 weight parts of p-vinyltriphenyl carbinol (m.p. 76°–78°C.), 3 weight parts of styrene, 0.09 parts by volume (2 percent by wt.) of p-divinylbenzene in 25 parts by volume of water, which contained 0.19 percent methylcellulose, .05 weight percent $Na_2Cr_2O_7$, using .011 part by weight of benzoyl peroxide as a catalyst. The mixture was stirred continuously and kept under $N_2$ during the polymerization step, which was effected in 6 hours at about 85°C. The resin, in the form of beads, was isolated by filtration, washed with water, methanol and then with four portions of benzene. The beads were dried at reduced pressure at 80°C. for 24 hours.

In the alternative procedure a 3:1 (molar) styrene-p-bromostyrene copolymer cross-linked with 2 weight percent divinylbenzene was prepared by the steps described above. The bead resin was dried. 3.0 g. of the resin were swollen in 100 ml. benzene and stirred for 6 days in a nitrogen atmosphere with 18 ml. of 1.6 N n-butyllithium in hexane. The resin beads were separated from the liquid and washed with four 5.0 ml. portions of benzene. The resin was blended with 3.0 g. p-(dimethylamino) benzophenone in 50 ml. benzene and heated at reflux for 60 hours. The resin was separated and washed with 1:1 aqueous tetrahydrofuran saturated with $NH_4Cl$ and then with several portions of tetrahydrofuran alone. Analysis indicated that about 80 percent of the bromine was removed and that 55 to 70 percent of the bromine atoms were replaced by carbinol moieties.

Other triaryl carbinols mentioned above can be prepared using one or the other of these techniques.

EXAMPLE 1

3.0 g. of the copolymer having triphenyl carbinol pendant groups were swollen with a mixture of 20 ml. $CH_2Cl_2$ and 18 ml. propionic anhydride. Three ml. of 48 percent fluoroboric acid in 12 ml. of propionic anhydride was added and the reaction mixture was stirred in a nitrogen atmosphere for 1 hour at room temperature. The resin was separated and washed with $CH_2Cl_2$ until the wash liquid was colorless. The beads were dried under vacuum.

The product of Example 1, containing $BF_4^-$, can be used to convert triaryl carbinols to the anionic derivatives. The carbonium ion $BF_4^-$ beads, swollen with $CH_2Cl_2$ were packed into a 1.2 × 20 cm. column and $(pCH_3\phi)_3$ COH, (0.5 g.) in 20 ml. $CH_2Cl_2$ was passed through the column. The carbinol was converted to $(pCH_3\phi)_3C^+BF_4^-$. An NMR spectrum of the eluent showed 100 percent conversion.

Another way for preparing the carbonium ion salt resin is to place the swollen beads in a column and trickle $HBF_4$ in solution in the swelling agent and then the wash liquids, such as methylene chloride, through the column.

The cross-linked copolymer containing tritylfluoroborate pendant groups produced by either method were opaque, dark red, and, when swollen, reacted with moisture to reform the carbinol. When solvent was removed from the beads, they are considerably more inert to atmospheric moisture. In the swollen states, the resinous and carbonium ion salt can be used for removing traces of water from organic solvents which are non-reactive with the resin.

EXAMPLE 2

The cross-linked copolymer containing bisdimethylaminotriphenylcarbinol pendant groups was swollen in an excess of $CH_2Cl_2$ and treated with 11 equivalents of tritylfluoroborate, and stirred under nitrogen for 4 hours. The red beads were separated and washed with $CH_2Cl_2$ until the liquid was colorless. The carbinol sites on the resin were quantitatively converted to fluoroborate ions. Using a similar technique $SbCl_5OH^-$ $SbCl_6^-$, $SnCl_5^-$, $AlBr_4^-$, and $ClO_4^-$ groups can replace the OH of the carbinol. Thus by substituting trityl antimonyl hexachloride or hexachloroantimonate, trityl antimonyl pentachlorohydroxide, trityl pentachlorostannate, trityl tetrabromoaluminate or trityl perchlorate, for the trityl fluoroborate, the anions of each of these reagents will replace OH in the carbinol.

The product of Example 2 can be used as an anion exchange resin in organic solvents such as $CH_2Cl_2$. Anion selectivities for this resin showed the order $Cl^- > NO_3^- > Br^- > I^- > BF_4^-$.

All the carbonium ion resins of this invention will react quantitatively with water and with many other nucleophilic compounds. Thus these resins can be used to remove from solution non-ionic nucleophic compounds of the structure $ROR'$, $RSR'$, $RSOR'$, $RR'R''N$,

where R, R' and R'' are H, alkyl or aryl groups.

I claim:

1. A cross-linked insoluble polymer having a plurality of pendant groups of the structure

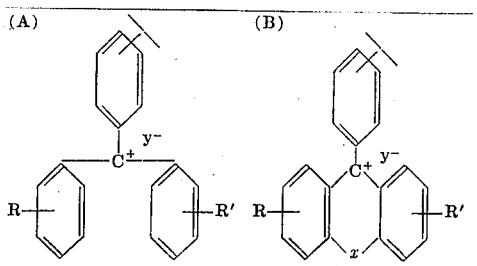

wherein R and R' each independently is H, an alkyl group of one to four carbon atoms, an aryl group, having from one to three rings, fused or unfused, a halogen atom, an —OR'', —SR'' or —NR$_2$'' group wherein R'' is H, an alkyl group of one to four carbon atoms, or an aryl group, and $x$ is O, S or N, and $y^-$ is $BF_4^-$, $SbCl_6^-$, $SbCl_5OH^-$ $ClO_4^-$, $SnCl_5^-$, or $AlBr_4^-$ and wherein the cross-linked polymer backbone is derived from copolymerizing a monoolefinically unsaturated monocyclic aromatic monomer with from about 0.1 to about 5 weight percent of a monomer having at least two polymerizable olefinic linkages, and the proportion of said pendant groups in said polymer ranges from about 1 to about 99.9 percent by weight.

2. The composition of claim 1 wherein the pendant groups have the structure (A).

3. The composition of claim 1 in which $y^-$ is $BF_4^-$.

4. The composition of claim 1 in which each R and R' is H.

5. The composition of claim 3 in which $y^-$ is $BF_4^-$.

6. The composition of claim 1 in which R and R' each is

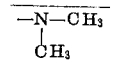

7. The composition of claim 5 in which $y^-$ is $BF_4^-$.

8. The composition of claim 5 in which i $y^-$ is $ClO_4$.

9. The composition of claim 5 in which $y^-$ is $SbCl_5Z$, wherein Z is Cl or OH.

10. The composition of claim 3 in which $y^-$ is $ClO_4$.

11. The composition of claim 3 in which $y^-$ is $SbCl_5Z$, wherein Z is Cl or OH.

12. A method of preparing a carbonium ion resin comprising blending under anhydrous conditions, a cross-linked insoluble resin having a backbone derived from copolymerization of from about 0.1 to about 5 weight percent of a monomer having at least two polymerizable olefinic linkages and a monoolefinically unsaturated monocyclic aromatic monomer said resin having from about 1 to about 99 weight percent of pendant triaryl carbinol groups, in a liquid organic solvent which is a swelling agent for the carbinol form and ionic form of the resin, adding a solution of a nonnucleophilic protic acid compound in a solvent which is chemically non-reactive with the carbinol or the ionic form of the resin, under the reaction condition employed, and separating the carbonium ion form of the resin from the swelling agent.

13. The method of claim 11 in which the pendant groups are triphenyl carbinol groups.

14. The method of claim 11 in which the pendant groups are phenyl bis (dimethylamino) phenyl carbinol groups.

* * * * *